(12) United States Patent
Shibata

(10) Patent No.: US 10,838,672 B2
(45) Date of Patent: Nov. 17, 2020

(54) IMAGE FORMING APPARATUS

(71) Applicant: KYOCERA Document Solutions Inc., Osaka (JP)

(72) Inventor: Yukihiro Shibata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/699,304

(22) Filed: Nov. 29, 2019

(65) Prior Publication Data

US 2020/0174721 A1    Jun. 4, 2020

(30) Foreign Application Priority Data

Nov. 30, 2018   (JP) .................................. 2018-224820

(51) Int. Cl.
| | | |
|---|---|---|
| *G06F 15/00* | (2006.01) | |
| *G06K 15/00* | (2006.01) | |
| *G06K 1/00* | (2006.01) | |
| *G06F 3/12* | (2006.01) | |
| *G06F 1/3234* | (2019.01) | |
| *G06F 1/3231* | (2019.01) | |

(52) U.S. Cl.
CPC .......... *G06F 3/1229* (2013.01); *G06F 1/3231* (2013.01); *G06F 1/3284* (2013.01); *G06F 3/1204* (2013.01); *G06F 3/1221* (2013.01)

(58) Field of Classification Search
CPC .... G06F 3/1229; G06F 3/1204; G06F 3/1221; G06F 1/3231; G06F 1/3284

USPC ............................... 358/1.1, 1.13, 1.14, 1.15
See application file for complete search history.

(56) References Cited

U.S. PATENT DOCUMENTS

| | | | | |
|---|---|---|---|---|
| 2014/0368855 | A1* | 12/2014 | Yamano | G06K 15/406 |
| | | | | 358/1.13 |
| 2016/0277877 | A1* | 9/2016 | Tsunoda | H04W 84/18 |
| 2018/0031700 | A1* | 2/2018 | Horishita | G01S 15/08 |
| 2020/0073341 | A1* | 3/2020 | Ichikawa | H04N 1/00896 |

FOREIGN PATENT DOCUMENTS

JP        2013230688 A      11/2013

* cited by examiner

*Primary Examiner* — Douglas Q Tran
(74) *Attorney, Agent, or Firm* — Studebaker & Brackett PC

(57) ABSTRACT

An image forming apparatus forms an image on a recording medium in a first operating mode. The image forming apparatus includes a detector, a determining section, a judging section, and a regulating section. The detector detects a detection target. The determining section determines, based on a detection result of the detector, to maintain a second operating mode in which power consumption is less than in the first operating mode. The judging section judges whether or not determination by the determining section is erroneous. The regulating section regulates, based on a judgement result of the judging section, the determination by the determining section of maintaining the second operating mode.

6 Claims, 5 Drawing Sheets

IMAGE FORMING APPARATUS

INCORPORATION BY REFERENCE

The present application claims priority under 35 U.S.C. § 119 to Japanese Patent Application No. 2018-224820, filed on Nov. 30, 2018. The contents of this application are incorporated herein by reference in their entirety.

BACKGROUND

The present disclosure relates to an image forming apparatus.

An image forming apparatus is capable of changing an operating mode thereof from a normal operating mode to a sleep operating mode. When a user is detected in the vicinity of the image forming apparatus in the sleep operating mode by a motion sensor, the image forming apparatus is returned from the sleep operating mode to the normal operating mode. Furthermore, the image forming apparatus is capable of changing the sensitivity of the motion sensor to determine whether or not the user will use the image forming apparatus.

SUMMARY

An image forming apparatus according to an aspect of the present disclosure forms an image on a recording medium in a first operating mode. The image forming apparatus includes a detector, a determining section, a judging section, and a regulating section. The detector detects a detection target. The determining section determines, based on a detection result of the detector, to maintain a second operating mode in which power consumption is less than in the first operating mode. The judging section judges whether or not determination by the determining section is erroneous. The regulating section regulates, based on a judgement result of the judging section, the determination by the determining section of maintaining the second operating mode.

DETAILED DESCRIPTION

Figure 1:
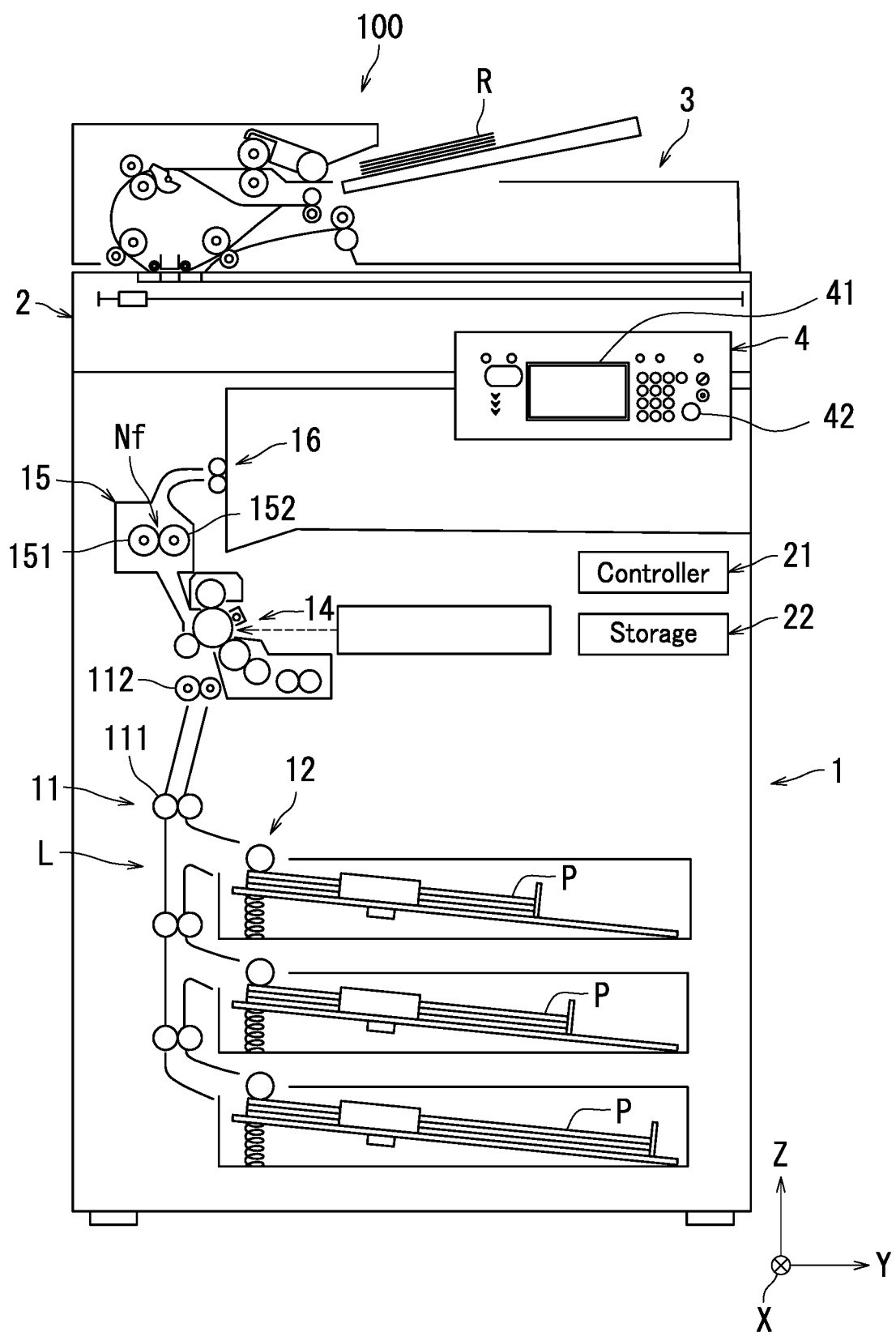
FIG. 1 is a diagram illustrating a configuration of an image forming apparatus according to an embodiment of the present disclosure.

The following describes an embodiment of the present disclosure with reference to the accompanying drawings. Elements that are the same or equivalent are labeled with the same reference signs in the drawings and description thereof is not repeated. According to the embodiment of the present disclosure, X, Y, and Z axes are orthogonal to each other. The X and Y axes are parallel to a horizontal plane, and the Z axis is parallel to a vertical direction.

First, an image forming apparatus 100 according to the embodiment of the present disclosure is described with reference to FIG. 1. FIG. 1 illustrates the image forming apparatus 100 according to the embodiment of the present disclosure.

As illustrated in FIG. 1, the image forming apparatus 100 includes an image forming unit 1, an image reading unit 2, a document conveyance unit 3, an operation section 4, a controller 21, and storage 22. The image forming unit 1 forms an image on a recording medium. The image reading unit 2 reads an image of a document R and generates image data indicating the image. The document conveyance unit 3 conveys the document R to the image reading unit 2.

The operation section 4 receives operation from a user. The operation section 4 includes a touch panel 41 and an operation key 42. The touch panel 41 includes a display device and a touch sensor. The display device displays various images. Examples of the display device include a liquid-crystal display (LCD) device. The touch sensor receives operation from the user. The operation key 42 also receives operation from the user. Examples of the operation from the user include a print job. The print job is an instruction to form an image on paper based on image data. The print job may be an instruction to form an image on one sheet of paper or multiple sheets of paper.

The image forming unit 1 includes a feeding section 12, a conveyance mechanism 11, an image forming section 14, a fixing section 15, and an ejection section 16. The image forming unit 1 has a conveyance path L.

The feeding section 12 feeds a sheet P to the conveyance path L. Examples of the sheet P include plain paper, copy paper, recycled paper, thin paper, thick paper, glossy paper, and overhead projector (OHP) sheet. The sheet P is equivalent to an example of a "recording medium".

The conveyance path L guides the sheet P from the feeding section 12 to the ejection section 16. The conveyance path L extends from the feeding section 12 to the ejection section 16.

The conveyance mechanism 11 conveys the sheet P. Specifically, the conveyance mechanism 11 conveys the sheet P to the ejection section 16 by way of the image forming section 14 and the fixing section 15.

The conveyance mechanism 11 includes a conveyance roller 111 and a registration roller 112.

The conveyance roller 111 conveys the sheet P sent from the feeding section 12 to the registration roller 112. The conveyance roller 111 is located in the conveyance path L.

The registration roller 112 adjusts the timing at which sheets P are conveyed to the image forming section 14. The registration roller 112 conveys the sheets P to the image forming section 14 at a prescribed interval. The registration roller 112 is located in the conveyance path L. The registration roller 112 is located upstream from the image forming section 14 in a conveyance direction of the sheets P.

The image forming section 14 forms an image on a sheet P. Specifically, the image forming section 14 forms a toner image on the sheet P. The image forming section 14 includes a transfer section, an image bearing member, a charger, a light exposure section, and a developing section.

The image bearing member is drum-shaped and has an axis of rotation. The image bearing member rotates clockwise around the axis of rotation. The image bearing member has a photosensitive layer on an outer circumferential surface thereof. The image bearing member is a photosensitive drum, for example.

The charger charges the photosensitive layer of the image bearing member to a prescribed potential. The light exposure section emits laser light to expose the photosensitive layer of the image bearing member. The light exposure section exposes the image bearing member based on image data. As a result, an electrostatic latent image is formed on the image bearing member.

The developing section develops the electrostatic latent image on the image bearing member. The developing section has a development roller. The development roller supplies toner to the image bearing member to develop the electrostatic latent image on the image bearing member, thus forming a toner image. As a result, a toner image is formed on the outer circumferential surface of the image bearing member.

The transfer section transfers the toner image formed on the outer circumferential surface of the image bearing member to the sheet P. As a result, the toner image is transferred to the sheet P. The transfer section includes a transfer roller.

The fixing section 15 applies heat to the sheet P to fix the image to the sheet P. Specifically, the fixing section 15 applies heat and pressure to the sheet P to fix the image formed on the sheet P to the sheet P. The fixing section 15 includes a heating roller 151 and a pressure roller 152. The heating roller 151 has a cylindrical shape with an axis of rotation, and rotates around the axis of rotation. The heating roller 151 is heated by a heating device.

The heating roller 151 presses against the pressure roller 152, through which a nip part Nf is formed between the heating roller 151 and the pressure roller 152. The sheet P passes through the nip part Nf between the heating roller 151 and the pressure roller 152. When the sheet P passes through the nip part Nf, the heating roller 151 makes contact with one side of the sheet P with the toner image formed thereon and fixes the toner image to the sheet P.

The ejection section 16 ejects the sheet P out of the image forming apparatus 100. After the fixing section 15 has fixed the toner image to the sheet P, the conveyance mechanism 11 conveys the sheet P from the fixing section 15 to the ejection section 16. The ejection section 16 then ejects the sheet P with the toner image fixed thereto out of the image forming apparatus 100.

The controller 21 controls operation of the image forming apparatus 100. The controller 21 includes a processor such as a central processing unit (CPU). The storage 22 includes a storage device and stores data and a computer program therein. Specifically, the storage 22 includes a primary storage device such as semiconductor memory and an auxiliary storage device such as either or both of semiconductor memory and a hard disk drive. The storage 22 may include removable media. The processor of the controller 21 executes the computer program stored in the storage device of the storage 22 to control the conveyance mechanism 11, the feeding section 12, the image forming section 14, the fixing section 15, the ejection section 16, the image reading unit 2, the document conveyance unit 3, and the operation section 4.

The image forming apparatus 100 further includes a casing 10 and a detector S1. The casing 10 houses the conveyance mechanism 11, the feeding section 12, the image forming section 14, the fixing section 15, the ejection section 16, the controller 21, and the storage 22.

The detector S1 detects a detection target. Specifically, the detector S1 detects a detection target present within a prescribed range from the image forming apparatus 100. The prescribed range is appropriately set by the user. The detector S1 is a motion sensor, for example. The detector S1 emits infrared rays, ultrasonic waves, visible light, or other light toward the detection target and detects the reflection to determine the presence of the detection target, and outputs a detection signal. For example, the detector S1 outputs a detection signal to the controller 21 upon detecting a user present within the prescribed range from the image forming apparatus 100. The user is an example of a "detection target".

Figure 2:
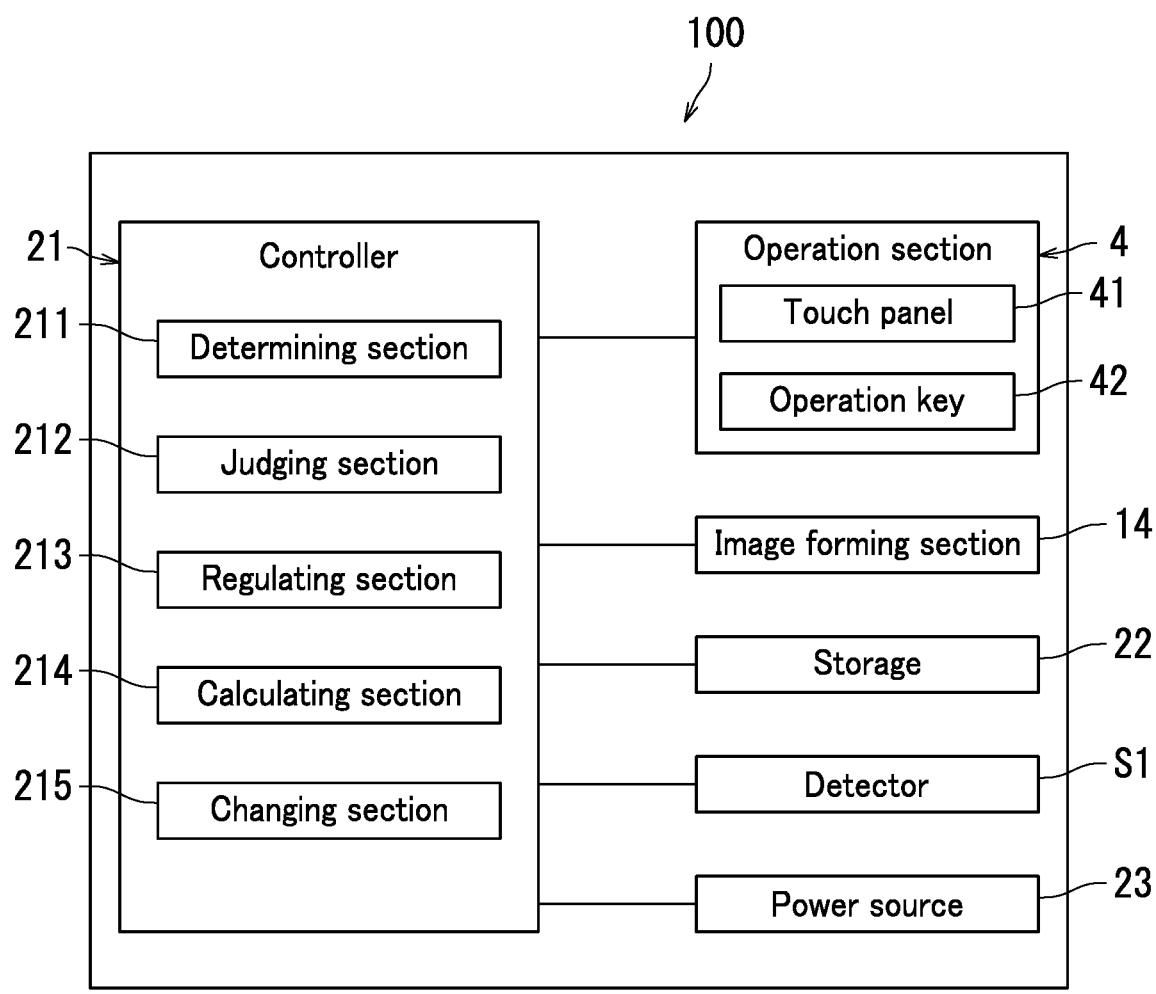
FIG. 2 is a block diagram illustrating a configuration of a controller according to the present embodiment.

Next, a configuration of the controller 21 is described with reference to FIG. 2. FIG. 2 is a block diagram illustrating the configuration of the controller 21.

The image forming section 14 further includes a power source 23. The power source 23 supplies electric power to the image forming apparatus 100. The power source 23 includes a power supply circuit. Depending on an instruction signal output from the controller 21, the power source 23 changes an operating mode of the image forming apparatus 100 to a first operating mode or a second operating mode. The first operating mode is a normal operating mode. In the first operating mode, the power source 23 supplies electric power to each part constituting the image forming apparatus 100, for example. The image forming apparatus 100 forms an image on the sheet P in the first operating mode. The second operating mode is a power-saving operating mode. In the second operating mode, the power source 23 supplies electric power to only some of the parts constituting the image forming apparatus 100, for example. The power consumption amount in the second operating mode is smaller than the power consumption amount in the first operating mode.

After a reference period has elapsed from the image forming apparatus 100 performing a print job, the power source 23 sets the operating mode of the image forming apparatus 100 to the second operating mode. The reference period is a period indicating a determination reference as to whether or not the operating mode is set to the second operating mode. The reference period is "10 minutes", for example. Accordingly, when no user uses the image forming apparatus 100, the operating mode of the image forming apparatus 100 can be changed to the second operating mode. As a result, wasteful power consumption of the image forming apparatus 100 can be prevented.

When the detector S1 of the image forming apparatus 100 in the second operating mode detects the user who is the detection target, the power source 23 changes the operating mode of the image forming apparatus 100 from the second operating mode to the first operating mode. Accordingly, when a user who will use the image forming apparatus 100 has approached the image forming apparatus 100, the operating mode of the image forming apparatus 100 can be changed from the second operating mode to the first operating mode. As a result, the image forming apparatus 100 can be used immediately, thereby improving convenience for the user.

The controller 21 includes a determining section 211, a judging section 212, and a regulating section 213. Specifically, the processor of the controller 21 functions as a determining section 211, a judging section 212, and a regulating section 213 by executing the computer program stored in the storage device of the storage 22.

The determining section 211 determines to maintain the second operating mode of the image forming apparatus 100. Specifically, the determining section 211 determines to maintain the second operating mode of the image forming apparatus 100 based on a determination result of the detector S1.

When the detector S1 has detected the user as the detection target, it is highly likely that the user detected by the detector S1 has approached the image forming apparatus 100 to pick up the sheet P with an image formed thereon from the image forming apparatus 100. That is, it is highly likely that the user does not plan to operate the image forming apparatus 100. Therefore, the determining section 211 can prevent wasteful power consumption of the image forming apparatus 100 by maintaining the second operating mode.

The judging section 212 judges whether or not the determination by the determining section 211 is erroneous.

The regulating section 213 regulates the determination by the determining section 211 of maintaining the second operating mode. Specifically, the regulating section 213 regulates the determination by the determining section 211 of maintaining the second operating mode based on a result of judgement by the judging section 212. That is, when the detector S1 detects the user, the operating mode of the image forming apparatus 100 is changed from the second operating mode to the first operating mode. Accordingly, burden for the user of operating the operation section 4 to change the operation mode the image forming apparatus 100 from the second operating mode to the first operating mode can be reduced. As a result, the convenience for the user is improved.

For example, when the image forming apparatus 100 is located in a narrow hallway, a user who will use the image forming apparatus 100 and a user who will not use the image forming apparatus 100 both approach the image forming apparatus 100. Therefore, it is difficult for the image forming apparatus 100 to judge whether or not a user will use the image forming apparatus 100. Supposing that the regulating section 213 were not to regulate the determining section 211, it would be burdensome for a user to operate the operation section 4 of the image forming apparatus 100 to change the operating mode of the image forming apparatus 100 from the second operating mode to the first operating mode. However, the regulating section 213 according to the present disclosure regulates the determining section 211. Accordingly, the user is free from the burden of changing the operating mode of the image forming apparatus 100 from the second operating mode to the first operating mode. As a result, the convenience for the user is improved.

The determining section 211 of the present embodiment determines to maintain the second operating mode when the detector S1 has detected the detection target within a prescribed period (may be referred to in the following as a prescribed period T1) after the image forming apparatus 100 has entered the second operating mode. Accordingly, the determining section 211 does not change the operating mode of the image forming apparatus 100 from the second operating mode to the first operating mode. As a result, wasteful power consumption of the image forming apparatus 100 can be prevented.

When the detector S1 has detected the user as the detection target within the prescribed period T1, it is highly likely that the user detected by the detector S1 does not plan to operate the image forming apparatus 100. Therefore, wasteful power consumption of the image forming apparatus 100 can be prevented through the determining section 211 determining to maintain the second operating mode.

Generally, the user picks up the sheet P with an image formed thereon from the image forming apparatus 100 in the time between the image forming apparatus 100 completing the print job and the image forming apparatus 100 changing from the first operating mode to the second operating mode (within "10 minutes", for example). At the latest, the user picks up the sheet P with the image formed thereon from the image forming apparatus 100 within for example "5 minutes" after the image forming apparatus 100 has entered the second operating mode. Accordingly, it is highly likely that a user approaching the image forming apparatus 100 within the prescribed period T1 since the image forming apparatus 100 has entered the second operating mode does not plan to operate the image forming apparatus 100. Therefore, when the detector S1 detects the user within the prescribed period T1 since the image forming apparatus 100 has entered the second operating mode, the determining section 211 determines to maintain the second operating mode.

When the detector S1 detects the user as the detection target after the prescribed period T1 has elapsed by contrast, it is highly likely that the user detected by the detector S1 is a user who has approached the image forming apparatus 100 to operate the image forming apparatus 100. Accordingly, when the detector S1 has detected the user after the prescribed period T1 has elapsed, the power source 23 changes the operating mode of the image forming apparatus 100 from the second operating mode to the first operating mode on the assumption that the user has approached the image forming apparatus 100 to use the image forming apparatus 100. As a result, the user need not change the operating mode of the image forming apparatus 100, thereby improving convenience for the user.

The judging section 212 of the present embodiment judges whether or not the determination by the determining section 211 is erroneous based on an operation result of the operation section 4. Accordingly, the judging section 212 can judge whether or not the determination by the determining section 211 is erroneous using the user's own operation as a trigger. As a result, whether or not the image forming apparatus 100 is to be used can be determined with high accuracy.

For example, when the user operates the operation section 4 after the determining section 211 has determined to maintain the second operating mode of the image forming apparatus 100, the user operating the operation section 4 is a user who has approached the image forming apparatus 100 to operate the image forming apparatus 100. Accordingly, the judging section 212 judges the determination by the determining section 211 to be erroneous. By contrast, when the user does not operate the operation section 4 after the determining section 211 has determined to maintain the second operating mode of the image forming apparatus 100, the user is a user who has approached the image forming apparatus 100 to pick up the sheet P with an image formed thereon from the image forming apparatus 100. Accordingly, the judging section 212 judges the determination by the determining section 211 not to be erroneous. Accordingly, the judging section 212 can judge whether or not the determination by the determining section 211 is erroneous using the user's own operation as a trigger.

The regulating section 213 of the present embodiment ends regulation of the determining section 211 in a preset period. That is, when a preset period has elapsed, the determining section 211 can determine to maintain the second operating mode of the image forming apparatus 100. Accordingly, the regulating section 213 can be prevented from continuing to regulate the determining section 211. As a result, the regulating section 213 can regulate the determining section 211 according to a usage pattern of the image forming apparatus 100 on a daily basis. Note that the preset period can be set by the user through the operation section 4.

For example, when the preset period is "24 hours", the regulating section 213 ends regulation of the determining section 211 when "24 hours" have elapsed.

Continuing, the configuration of the controller 21 is described in detail with reference to FIG. 2. The controller 21 further includes a calculating section 214 and a changing section 215. Specifically, the processor of the controller 21 functions as a calculating section 214 and a changing section 215 by executing the computer program stored in the storage device of the storage 22.

The calculating section 214 calculates the number of times of determination (may be referred to in the following as a determination number DN) and the number of times of receipt (may be referred to in the following as a receipt number AN). The determination number DN is the number of times the determining section 211 has determined to maintain the second operating mode. The calculating section 214 calculates the number of times the determining section 211 has determined to maintain the second operating mode. The determination number DN calculated by the calculating section 214 is stored in the storage 22. The receipt number AN is the number of times the operation section 4 has received operation from the user after the determination by the determining section 211. The calculating section 214 calculates the number of times the operation section 4 has received operation from the user after the determination by the determining section 211. The receipt number AN calculated by the calculating section 214 is stored in the storage 22.

The calculating section 214 calculates a "misdetermination rate". The misdetermination rate (may be referred to in the following as a misdetermination rate EP) is a ratio of the receipt number AN to the determination number DN. The misdetermination rate EP is calculated with the following formula (1).

$$(AN/DN) \times 100 \quad \text{Formula (1)}$$

The regulating section 213 regulates the determination by the determining section 211 of maintaining the second operating mode based on a calculation result of the calculating section 214. Specifically, the regulating section 213 regulates the determination by the determining section 211 of maintaining the second operating mode based on the misdetermination rate EP calculated by the calculating section 214. More specifically, when the misdetermination rate EP exceeds a prescribed threshold (may be referred to in the following as a threshold TH), the regulating section 213 regulates the determination by the determining section 211 of maintaining the second operating mode. Accordingly, in a state where the misdetermination rate EP has exceeded the prescribed threshold TH, the operating mode of the image forming apparatus 100 is changed from the second operating mode to the first operating mode when the detector S1 detects the user. As a result, the burden on the user of operating the operation section 4 of the image forming apparatus 100 to change the operating mode of the image forming apparatus 100 from the second operating mode to the first operating mode can be reduced, thereby improving the convenience for the user.

For example, when the prescribed threshold TH is "70%" and the misdetermination rate EP exceeds "70%", the regulating section 213 regulates the determination by the determining section 211 of maintaining the second operating mode. That is, when the user approaches the image forming apparatus 100, the operating mode of the image forming apparatus 100 is changed from the second operating mode to the first operating mode.

That is, a condition where the misdetermination rate EP exceeds the prescribed threshold TH is not a condition where it is effective to maintain the second operating mode of the image forming apparatus 100. Accordingly, the regulating section 213 regulates the determination by the determining section 211 of maintaining the second operating mode. As a result, the burden on the user of operating the operation section 4 of the image forming apparatus 100 to change the operating mode of the image forming apparatus 100 from the second operating mode to the first operating mode can be reduced, thereby improving the convenience for the user.

When the misdetermination rate EP does not exceed "70%" by contrast, the regulating section 213 does not regulate the determining section 211. Accordingly, the determining section 211 maintains the second operating mode of the image forming apparatus 100 when the detector S1 detects the user within the prescribed period T1 from the operating mode of the image forming apparatus 100 being changed from the first operating mode to the second operating mode. As a result, the image forming apparatus 100 can prevent wasteful power consumption.

The changing section 215 changes the operation mode of the image forming apparatus 100 from the second operating mode to the first operating mode. Specifically, when the detector S1 has detected the detection target after the prescribed period T1 has elapsed, the changing section 215 changes the operation mode of the image forming apparatus 100 from the second operating mode to the first operating mode. Accordingly, when the user approaches the image forming apparatus 100, the operating mode of the image forming apparatus 100 is changed from the second operating mode to the first operating mode. As a result, the convenience for the user is improved.

In general, a user approaching the image forming apparatus 100 after "5 minutes" has elapsed from the image forming apparatus 100 entering the second operating mode is highly likely to be a user who will operate the image forming apparatus 100. Accordingly, when the user approaches the image forming apparatus 100, the operating mode of the image forming apparatus 100 is changed from the second operating mode to the first operating mode. As a result, the convenience for the user is improved.

The controller 21 resets the determination number DN and the receipt number AN after a predetermined period. Accordingly, the controller 21 returns the determination number DN and the receipt number AN to respective initial values after the predetermined period. The initial values each are "0", for example. The predetermined period is "24 hours", for example. Accordingly, the misdetermination rate EP also becomes "0". As a result, the day-to-day usage pattern of the image forming apparatus 100 can be matched to the operating mode of the image forming apparatus 100.

Figure 3:
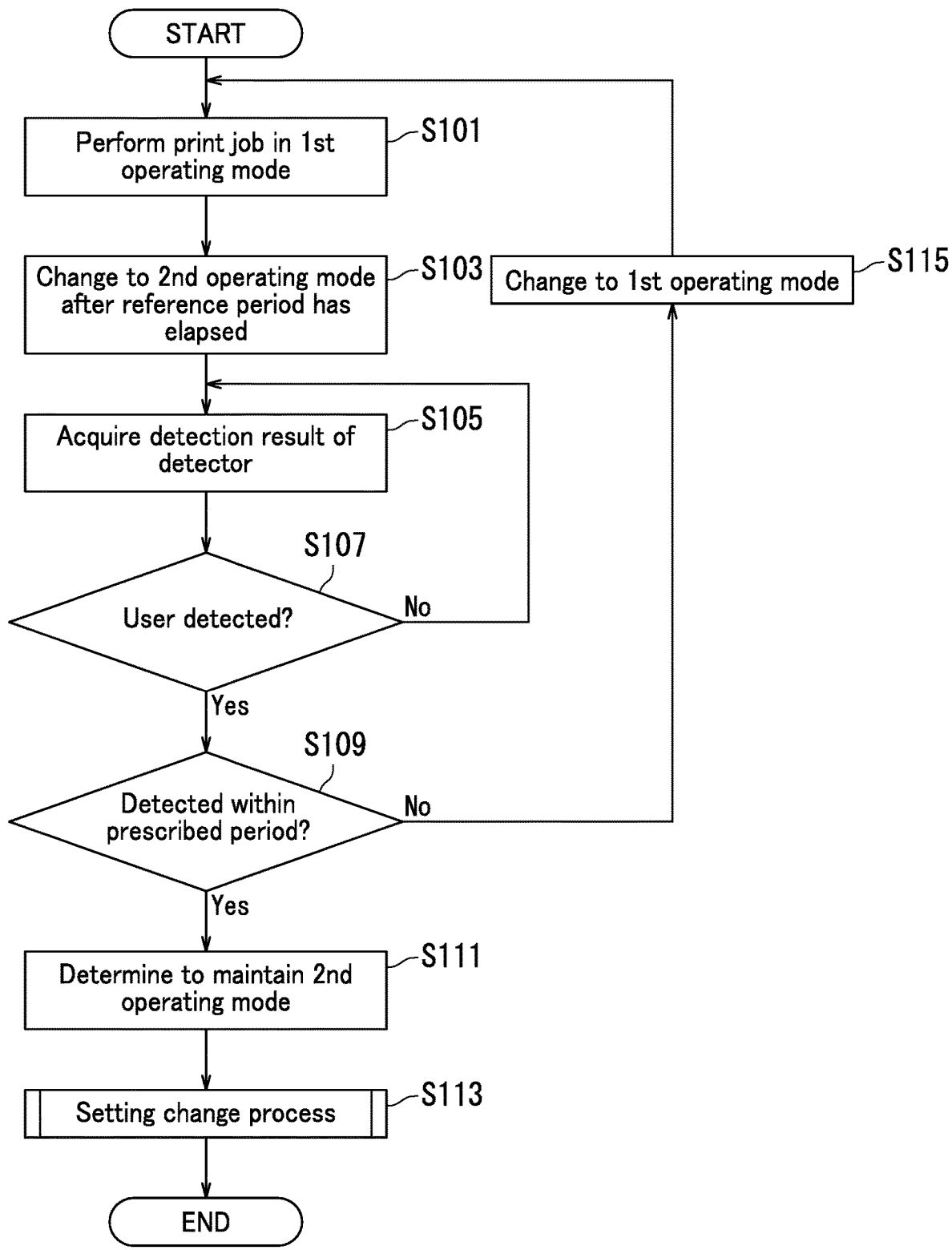
FIG. 3 is a flowchart depicting a process performed by the controller according to the present embodiment.

Next, a process performed by the controller 21 is described with reference to FIG. 3. FIG. 3 is a flowchart depicting the process performed by the controller 21. As depicted in FIG. 3, the process performed by the controller 21 includes Steps S101 to S115.

In Step S101, the image forming apparatus 100 performs a print job in the first operating mode. The process advances to Step S103.

In Step S103, the controller 21 controls the power source 23 such that the power source 23 changes the operating mode of the image forming apparatus 100 to the second operating mode after the reference period has elapsed. The process advances to Step S105.

In Step S105, the controller 21 acquires the detection result of the detector S1. The process advances to Step S107.

In Step S107, the controller 21 judges whether or not the detector S1 has detected the user. When the detector S1 has not detected the user (No in Step S107), the process returns to Step S105. Accordingly, the second operating mode of the image forming apparatus 100 is maintained. As a result, wasteful power consumption of the image forming apparatus 100 can be prevented. When the detector S1 has detected the user by contrast (Yes in Step S107), the process advances to Step S109.

In Step S109, the controller 21 judges whether or not the detector S1 has detected the user within the prescribed period T1. When the detector S1 has not detected the user within the prescribed period T1 (No in Step S109), the process advances to Step S115. When the detector S1 has detected the user within the prescribed period T1 by contrast (Yes in Step S109), the process advances to Step S111.

When an affirmative determination is made in Step S109, the determining section 211 determines to maintain the second operating mode of the image forming apparatus 100 in Step S111. The process advances to Step S113.

In Step S113, the controller 21 performs a setting change process. The setting change process is described later with reference to FIG. 4. The process ends.

When a negative determination is made in Step S109, the controller 21 controls the power source 23 such that the power source 23 changes the operating mode of the image forming apparatus 100 to the first operating mode in Step S115. The process returns to Step S101.

Figure 4:
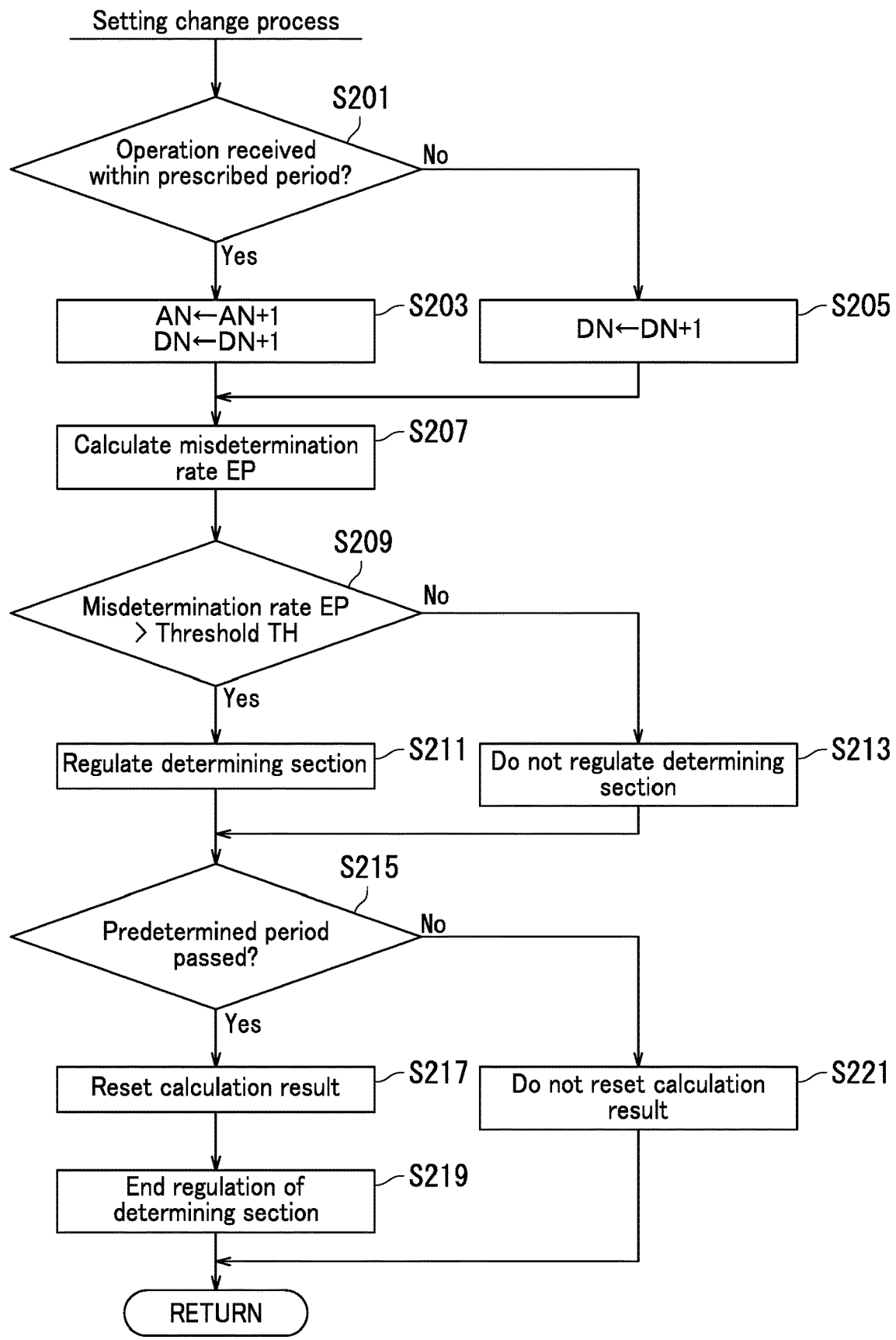
FIG. 4 is a flowchart depicting a setting change process according to the present embodiment.

Next, the setting change process is described with reference to FIGS. 3 and 4. As depicted in Step S109 of FIG. 3, the controller 21 performs the setting change process each time the determining section 211 determines to maintain the second operating mode. FIG. 4 is a flowchart depicting the setting change process in detail. As illustrated in FIG. 4, the setting change process includes Steps S201 to S221.

In Step S201, the controller 21 determines whether or not the operation section 4 has received operation within the prescribed period T1. When the operation section 4 has not received operation within the prescribed period T1 (No in Step S201), the process advances to Step S205. When the operation section 4 has received operation within the prescribed period T1 (Yes in Step S201), the process advances to Step S203.

When an affirmative determination is made in Step S201, the controller 21 increases both the receipt number AN and the determination number DN by an increment of "1" in Step S203. The process advances to Step S207.

When a negative determination is made in Step S201, the controller 21 increases only the determination number DN by an increment of "1" in Step S205. The controller 21 does not increase the receipt number AN. The process advances to Step S207.

After Step S203 or Step S205, the controller 21 calculates the misdetermination rate EP in Step S207. The process advances to Step S209.

In Step S209, the controller 21 determines whether or not the misdetermination rate EP has exceeded the prescribed threshold TH. When the misdetermination rate EP has not exceeded the prescribed threshold TH (No in Step S209), the process advances to Step S213. When the misdetermination rate EP has exceeded the prescribed threshold TH (Yes in Step S209), the process advances to Step S211.

When an affirmative determination is made in Step S209, the regulating section 213 regulates the determination by the determining section 211 of maintaining the second operating mode of the image forming apparatus 100 in Step S211. The process advances to Step S215.

When a negative determination is made in Step S209, the regulating section 213 does not regulate the determination by the determining section 211 of maintaining the second operating mode of the image forming apparatus 100 in Step S213. The process advances to Step S215.

After Step S211 or Step S213, the controller 21 determines whether or not the predetermined period has passed in Step S215. When the controller 21 determines that the predetermined period has not passed (No in Step S215), the process advances to Step S221. When the controller 21 determines that the predetermined period has passed (Yes in Step S215), the process advances to Step S217.

When an affirmative determination is made in Step S215, the controller 21 resets the calculation result of the calculating section 214 in Step S217. Specifically, the controller 21 resets the calculation result by setting both of the determination number DN and the receipt number AN to "0". The process advances to Step S219.

In Step S219, the regulating section 213 ends regulation of the determining section 211. The process returns to the flowchart in FIG. 3.

When a negative determination is made in Step S215, the controller 21 resets neither the determination number DN nor the receipt number AN in Step S221. The process returns to the flowchart in FIG. 3.

Figure 5:
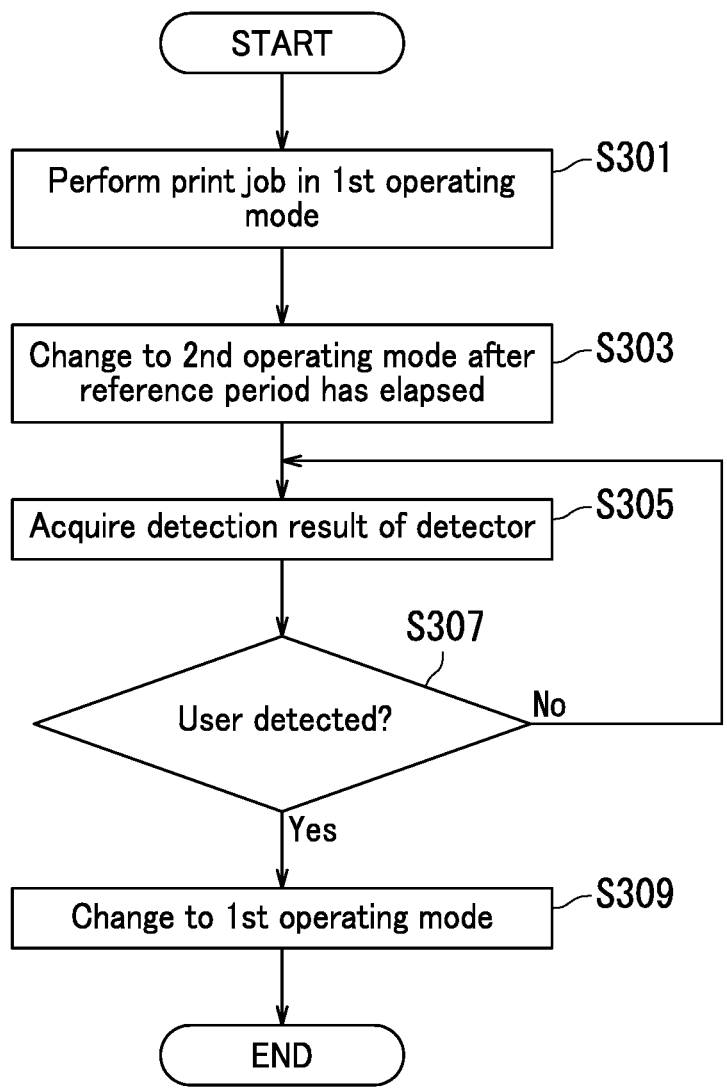
FIG. 5 is a flowchart depicting a process performed when a regulating section has regulated a determining section according to the present embodiment.

Next, a process performed when the regulating section 213 has regulated the determination by the determining section 211 of maintaining the second operating mode is described with reference to FIG. 5. FIG. 5 is a flowchart depicting the process performed when the regulating section 213 has regulated the determining section 211. The process performed when the regulating section 213 has regulated the determining section 211 includes Steps S301 to S309.

In Step S301, the image forming apparatus 100 performs a print job in the first operating mode. The process advances to Step S303.

In Step S303, the controller 21 controls the power source 23 such that the power source 23 changes the operating mode of the image forming apparatus 100 to the second operating mode after the reference period has elapsed. The process advances to Step S305.

In Step S305, the controller 21 acquires the detection result of the detector S1. The process advances to Step S307.

In Step S307, the controller 21 determines whether or not the detector S1 has detected the user. When the detector S1 has not detected the user (No in Step S307), the process returns to Step S305. Accordingly, the second operating mode of the image forming apparatus 100 is maintained. When the detector S1 has detected the user by contrast (Yes in Step S307), the process advances to Step S309.

In Step S309, the controller 21 controls the power source 23 such that the power source 23 changes the operating mode of the image forming apparatus 100 to the first operating mode. The process ends.

An embodiment of the present disclosure is described above with reference to the accompanying drawings. However, the present disclosure is not limited to the above embodiment and may be implemented in various manners within a scope not departing from the gist thereof. Furthermore, elements of configuration disclosed in the above embodiment may be appropriately combined to form various disclosures. For example, some of elements of configuration may be removed from all of the elements of configuration illustrated in the embodiment. The drawings illustrate main elements of configuration schematically to facilitate understanding thereof. Aspects of the elements of configuration illustrated in the drawings, such as thickness, length, number, and interval, may differ in practice for the sake of convenience for drawing preparation. In addition, aspects of the elements of configuration illustrated in the above embodiment, such as shape are one example and not particularly limited. The aspects of the elements of configuration may be variously altered within a scope not substantially departing from the configuration of the present disclosure.

What is claimed is:

1. An image forming apparatus which forms an image on a recording medium in a first operating mode, the image forming apparatus comprising:
    a detector configured to detect a detection target;
    a determining section configured to determine, based on a detection result of the detector, to maintain a second operating mode in which power consumption is less than in the first operating mode;
    a judging section configured to judge whether or not determination by the determining section is erroneous; and
    a regulating section configured to regulate, based on a judgement result of the judging section, the determination by the determining section of maintaining the second operating mode.

2. The image forming apparatus according to claim 1, further comprising
    an operation section configured to receive operation from a user, wherein
    the judging section judges whether or not the determination by the determining section is erroneous based on an operation result of the operation section.

3. The image forming apparatus according to claim 2, further comprising
    a calculating section configured to calculate a determination number and a receipt number, wherein
    the determination number is a number of times the determining section has determined to maintain the second operating mode,
    the receipt number is a number of times the operation section has received operation from the user after the determination, and
    the regulating section regulates, based on the calculation result of the calculating section, the determination by the determining section of maintaining the second operating mode.

4. The image forming apparatus according to claim 1, wherein
    when the detector has detected the detection target within a prescribed period after the image forming apparatus has entered the second operating mode, the determining section determines to maintain the second operating mode.

5. The image forming apparatus according to claim 4, further comprising
    a changing section configured to change an operation mode of the image forming apparatus from the second operating mode to the first operating mode, wherein
    when the detector has detected the detection target after the prescribed period has elapsed, the changing section changes the operation mode of the image forming apparatus from the second operating mode to the first operating mode.

6. The image forming apparatus according to claim 1, wherein
    the regulating section ends regulation of the determining section after a predetermined period elapses.

* * * * *